(12) United States Patent
Krish, Sr. et al.

(10) Patent No.: US 7,073,364 B2
(45) Date of Patent: Jul. 11, 2006

(54) DIE ASSEMBLY HAVING FLOATING DIE SECTION

(76) Inventors: Joseph J. Krish, Sr., 4859 Hawkins Rd., Richfield, OH (US) 44286; William R. Reis, 1049 Yarmouth Dr., Grafton, OH (US) 44044

( * ) Notice: Subject to any disclaimer, the term of this patent is extended or adjusted under 35 U.S.C. 154(b) by 29 days.

(21) Appl. No.: 10/855,154

(22) Filed: May 27, 2004

(65) Prior Publication Data

US 2005/0262919 A1    Dec. 1, 2005

(51) Int. Cl.
*B21J 13/03*    (2006.01)
(52) U.S. Cl. .............................. 72/334; 72/404; 72/448
(58) Field of Classification Search ................. 72/404, 72/337, 339, 385, 448, 334
See application file for complete search history.

(56) References Cited

U.S. PATENT DOCUMENTS

| | | | | |
|---|---|---|---|---|
| 1,400,416 A | | 12/1921 | Cameron | |
| 3,344,647 A | * | 10/1967 | Berger | 72/361 |
| 3,600,927 A | | 8/1971 | Wahler | |
| 3,768,295 A | * | 10/1973 | Cudzik | 72/347 |
| 3,880,020 A | | 4/1975 | Clem | |
| 4,067,098 A | | 1/1978 | Blair, Jr. | |
| 4,741,194 A | * | 5/1988 | Kozyra et al. | 72/334 |
| 4,989,440 A | * | 2/1991 | Sjogren | 72/385 |
| 5,715,721 A | * | 2/1998 | Anders et al. | 72/311 |
| 6,530,256 B1 | * | 3/2003 | Irie et al. | 72/370.1 |

\* cited by examiner

*Primary Examiner*—Daniel C. Crane
(74) *Attorney, Agent, or Firm*—Fay, Sharpe, Fagan, Minnich & McKee, LLP

(57) ABSTRACT

A die assembly for use on a press and adapted to form a plurality of features on a strip of material. The die assembly includes a first die section and a second die section. The first die section is supported on the press and has a first tooling surface for forming a first feature. The second section is moveably supported on the press relative to the first section and has second and third tooling surfaces. The second tooling surface engages the first feature and locates the second die section relative thereto. The third tooling surface is for forming a second feature. A method is also disclosed.

22 Claims, 10 Drawing Sheets

DIE ASSEMBLY HAVING FLOATING DIE SECTION

BACKGROUND

The present invention broadly relates to the art of metal forming and, more particularly, to a die assembly having a floating die section suitable for forming a second feature on a strip of material in relation to an earlier-formed first feature thereby minimizing errors due to misalignment between the strip of material and the individual die sections.

The manufacture of workpieces or parts from sheet material, particularly metals, by various stamping and/or other forming methods is pervasive and well understood. The production of objects using such methods has numerous distinct advantages over other methods of production. Chief among these advantages is that objects produced from sheet material are often less expensive to manufacture than equivalent objects produced by other methods. One reason for this is that complete, finished parts can often be formed by stamping or other such metal forming methods whereas unfinished blanks, such as those from casting or forging methods, normally need to be machined or otherwise modified to produce a compete, finished part. Such machining or other processing generally adds significant cost to the part. Similar high costs are commonly associated with parts machined entirely from bar stock, as well. However, these costs are generally avoided in stamping and other forming processes.

Numerous other advantages associated with the use of stamping and other forming processes are also well known. One disadvantage, however, is the tendency of such processes to utilize a wider tolerance range for a given feature when compared to tolerance ranges for equivalent machined parts. That is, in objects at least partially produced by machining operations, tighter dimensional and/or positional tolerances are typically less challenging to maintain than in equivalent stamped parts. Furthermore, as machining methods continue to improve in speed and accuracy, parts and components are being designed with increasingly tight tolerances to improve the performance and/or interchangeability of the parts. Accordingly, it is believed desirable to develop a die assembly and method for forming features on sheet material that aids in improving the production of parts manufactured by stamping and other forming processes.

BRIEF DESCRIPTION

A die assembly for use on a press and adapted to form a plurality of features on a strip of material is provided and includes a first die section and a second die section. The first die section is supported on the press and has a first tooling surface for forming a first feature. The second die section is movably supported on the press relative to the first die section and has second and third tooling surfaces. The second tooling surface engages the first feature and locates the second die section relative thereto. The third tooling surface is for forming a second feature.

A die assembly adapted to form first and second features on a strip of material is provided and includes a first die section and a second die section. The first die section has first upper and lower die portions with corresponding first upper and lower tooling surfaces for forming a first feature. The second die section is movable in relation to the first die section and has second upper and lower die portions with corresponding second upper and lower tooling surfaces for forming a second feature. One of the second upper and lower die sections also includes a third tooling surface for engaging the first feature to thereby locate the second die section relative thereto.

A method of forming first and second features on a strip of material is also provided and includes a step of providing a first die section having a first tooling surface and a second die section having second and third tooling surfaces. The second die section being movable relative to the first die section. Another step includes providing the strip of material and advancing a portion of the strip of material into a first position adjacent the first tooling surface of the first die section. Still another step includes forming a first feature on the strip of material using the first tooling surface. A further step includes advancing the strip of material into a second position such that the first feature is adjacent the second tooling surface. Still a further step includes engaging the second tooling surface and the first feature to locate the second die section relative thereto. Another step includes forming a second feature on the strip of material using the third tooling surface.

DETAILED DESCRIPTION

Figure 1:
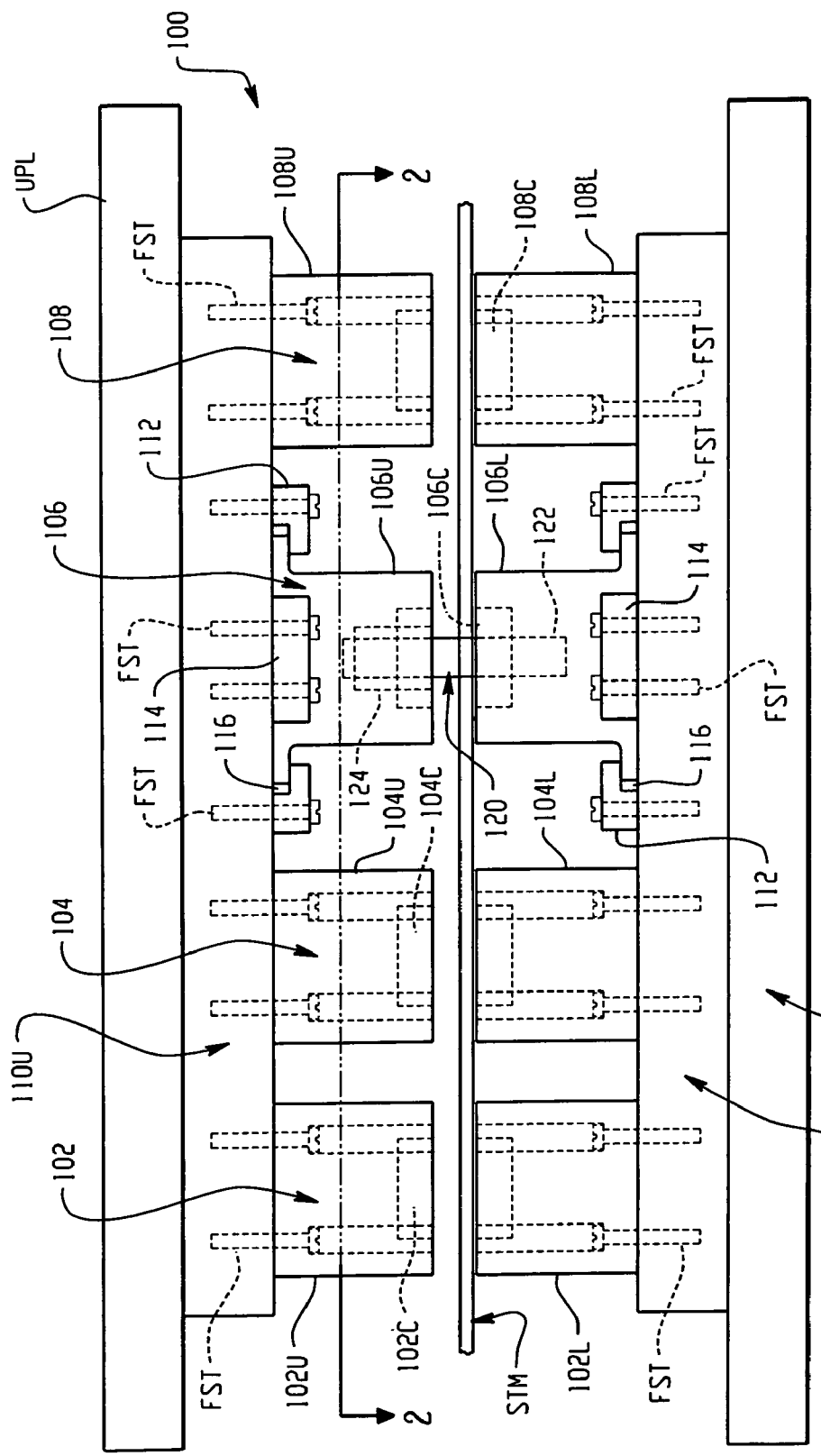
FIG. 1 is a side view of one embodiment of a die assembly having a floating die section in accordance with the present invention.
Figure 2:
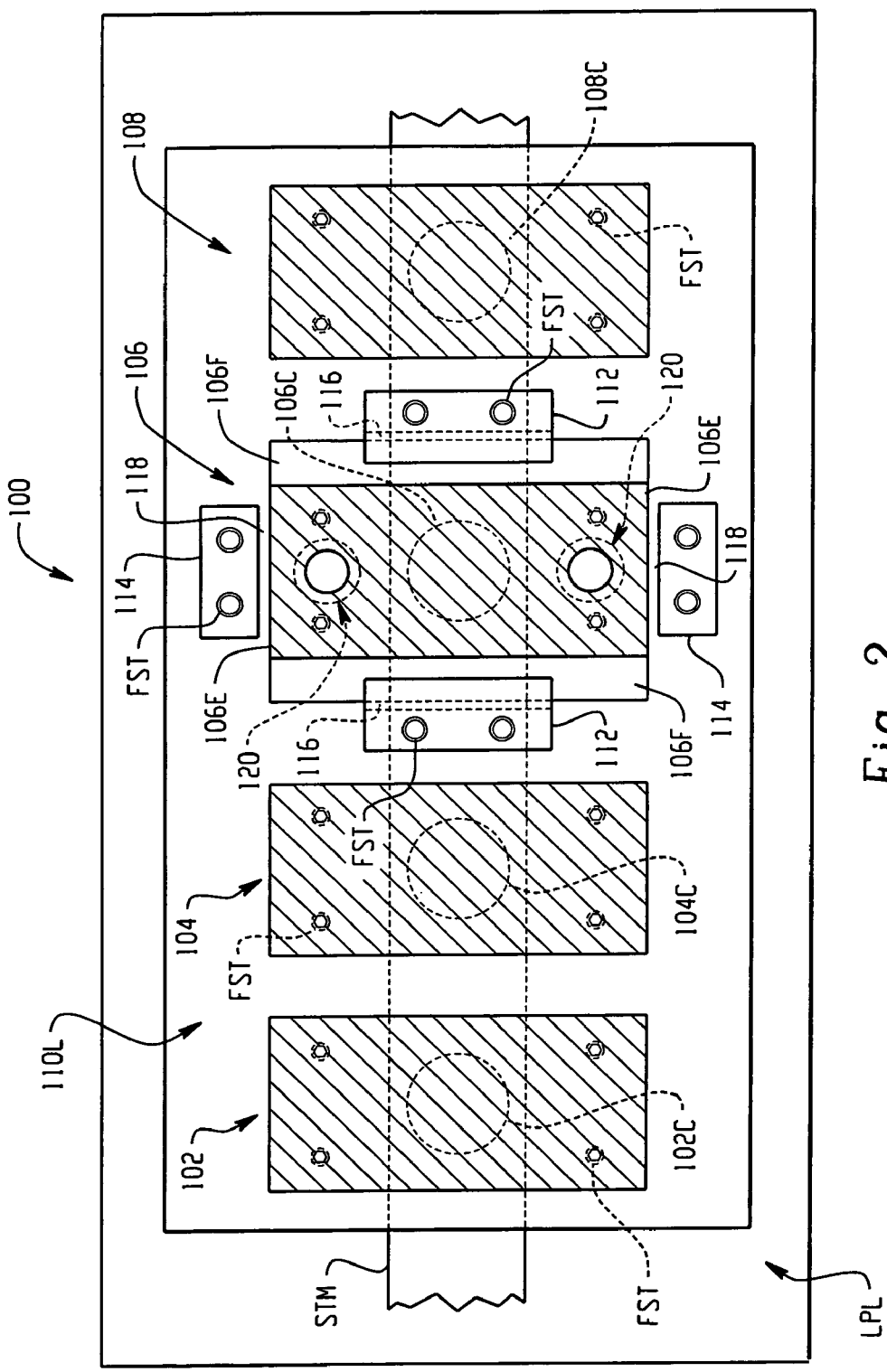
FIG. 2 is a top plan view, in cross section, of the die assembly shown in FIG. 1 taken along line 2—2.

Referring now in greater detail to the drawings, wherein the showings are for the purpose of illustrating preferred embodiments of the invention only, and not for the purpose of limiting the invention, FIGS. 1 and 2 illustrate a die assembly 100 supported between an upper platen UPL and a lower platen LPL of a press (not shown). Die assembly 100 includes die sections 102, 104, 106 and 108. Each of the die sections includes an upper die portion 102U, 104U, 106U and 108U, and a corresponding lower die portion 102L, 104L, 106L and 108L. Additionally, each die section includes one or more tooling surfaces provided on the upper die portion and/or the lower die portion. The tooling surfaces are illustrated in FIGS. 1 and 2 on each of the upper portions and lower portions as cavities 102C, 104C, 106C and 108C. It will be appreciated by the skilled artisan that the die sections shown in FIGS. 1 and 2, as well as the tooling surfaces and/or cavities thereof, will not, in practice, be identical as shown in FIGS. 1 and 2. Rather, each of the die sections will be adapted to form a specific feature or portion of the workpiece being manufactured and that a greater or lesser number of die sections may be used. Additionally, it will be appreciated that the various die sections can form these features in any suitable manner, such as stamping, blanking, coining, drawing, breaking or by any other forming process.

Die assembly 100 includes an upper die shoe 110U and a lower die shoe 110L. Die shoes 110U and 110L are optional, though it will be appreciated that such components are commonly used. Upper die shoe 110U is secured to upper platen UPL in a typical manner, such as by using pins (not shown) and/or fasteners (not shown), for example. Lower die shoe 110L is secured to lower platen LPL in a similar manner.

The die sections are longitudinally spaced from one another between the upper and lower platens of the press. The upper and lower die portions of each die section are in spaced relation to one another, and a strip of material STM extends longitudinally therebetween. Additionally, the upper portions of each die section are supported on to the upper die shoe and the lower portions of each die section are supported on to the lower die shoe. As is apparent from FIGS. 1 and 2, however, each of the portions of die sections 102, 104 and 108 are fixedly secured to the respective die shoe in a suitable manner, such as by using fasteners FST, for example. Die section 106, however, is movably supported between the die shoes.

As can be better seen in FIG. 2, the upper and lower portions of die section 106 each include laterally extending flanges 106F and opposing end walls 106E. Keeper blocks 112 engage flanges 106F and secure the corresponding die portion adjacent the respective die shoe. Additionally, end stops 114 are secured on the upper and lower die shoes in spaced relation to end walls 106E. As such, a gap 116 is provided between die section 106 and each keeper block 112, and a gap 118 is provided between end walls 106E and the respective end stops 114. Keeper blocks 112 and end stops 114 are secured to the respective die shoes in a suitable manner, such as by using fasteners FST, for example. It will be appreciated that keeper blocks 112 and flanges 106F are cooperably dimensioned to permit the floating movement of die section 106 while retaining the upper and lower die portions in association with the upper and lower die shoes, respectively. As such, die section 106 is able to translate in any direction along and between the inner surfaces of the upper and lower die shoes within the area bounded by the keeper blocks and end stops. Gaps 116 between flanges 106F and keeper blocks 112 are, in one embodiment, substantially equal to gaps 118 between end stops 114 and end walls 106E of the die portions. However, it will be appreciated that any suitable arrangement of gaps can be used without departing from the principles of the present invention.

As each of the upper and lower die portions of die section 106 are adapted to move in relation to fixed die sections 102, 104 and 108, alignment members 120 are disposed between the upper and lower die portions of die section 106 to maintain the relative alignment between the same. It will be appreciated that any suitable arrangement for maintaining the alignment between the upper and lower die portions can be used, such as using an alignment rod 122 and a guide bushing 124, for example. As shown in FIG. 2, two alignment members in spaced relation can optionally be used.

Figure 3:
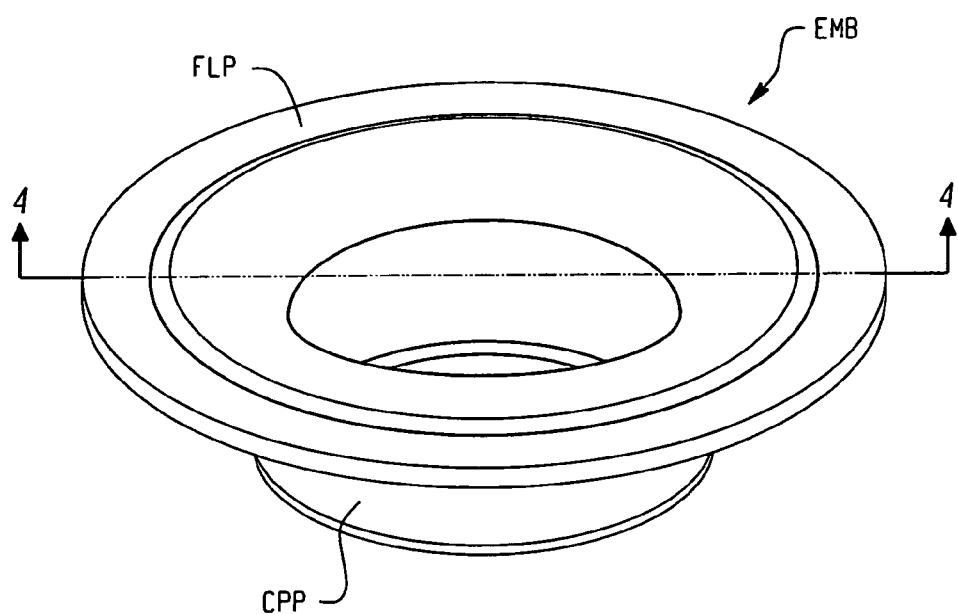
FIG. 3 is a perspective view of one example of a workpiece suitable for manufacture using a die assembly in accordance with the present invention.
Figure 4:
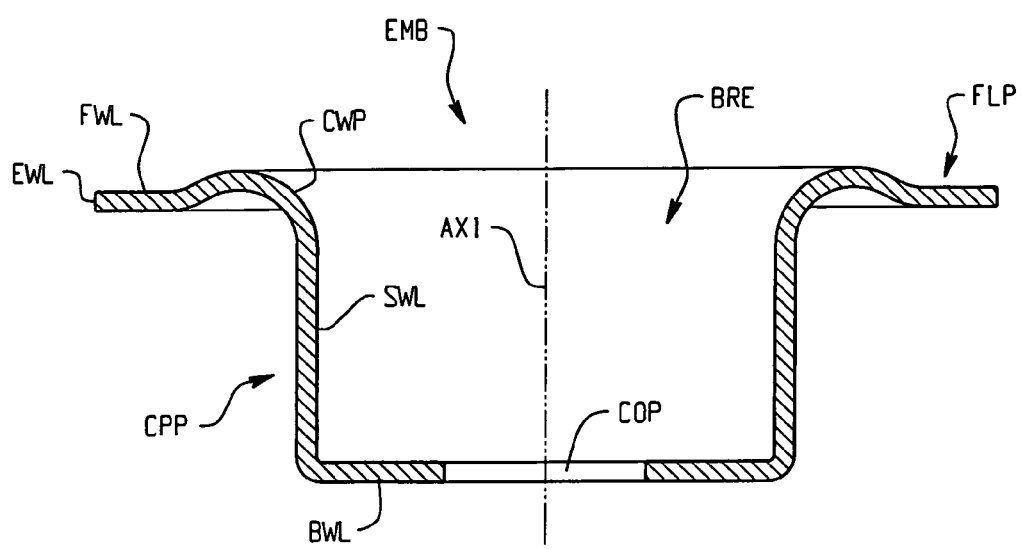
FIG. 4 is a side view, in cross section, of the workpiece shown in FIG. 3 taken along line 4—4.
Figure 5:
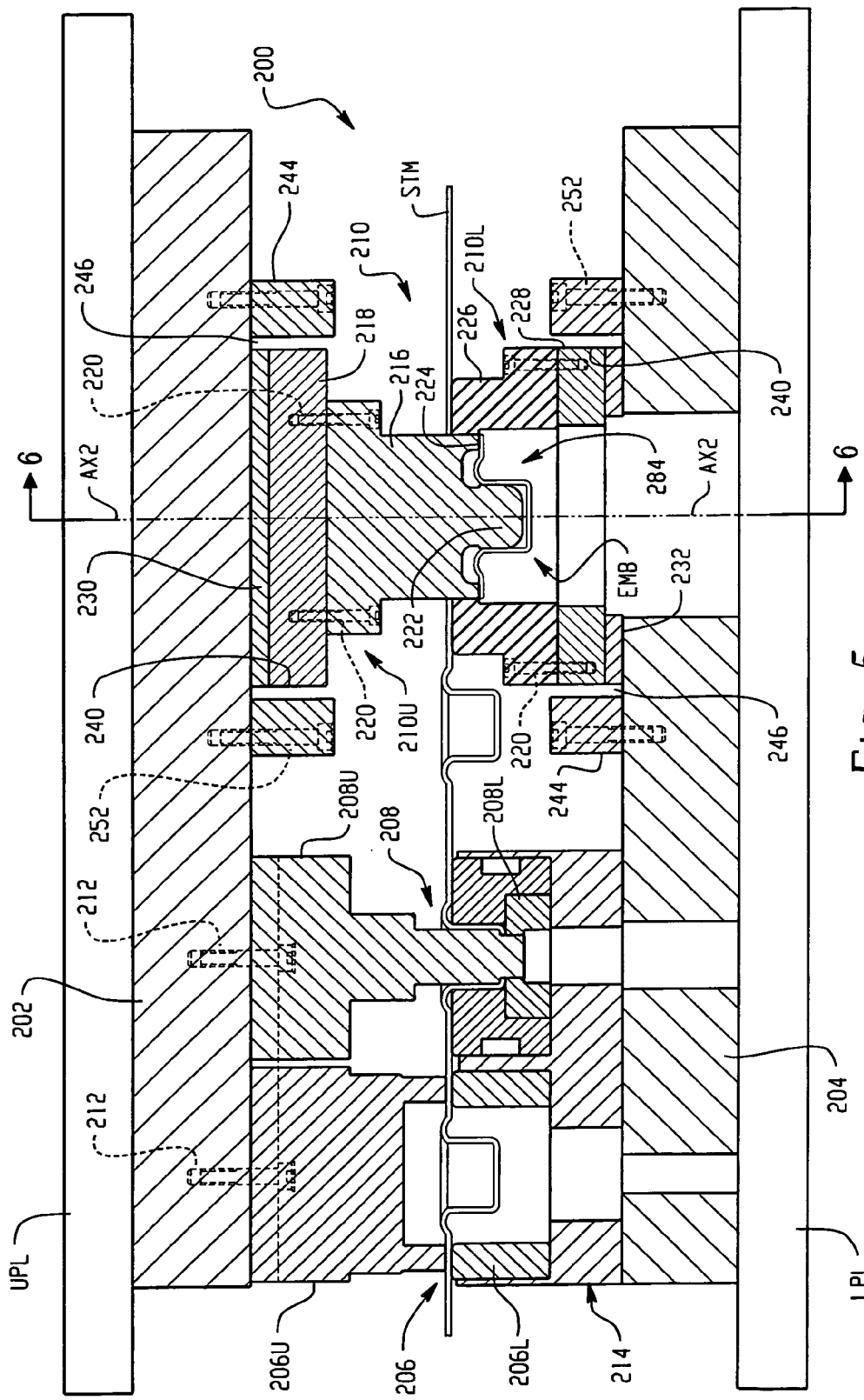
FIG. 5 is a front view, in partial cross section, of another embodiment of a die assembly in accordance with the present invention shown forming workpieces of FIGS. 3 and 4 from a strip of material.

FIGS. 3 and 4 illustrate an end member EMB for a conveyor roller. End member EMB merely represents one example of a part or workpiece that is suitable for manufacture using a die assembly in accordance with the present invention. End member EMB can be formed from any suitable sheet material, such as strip steel having a thickness of from about 0.098 inches to about 0.270 inches, for example. The end member includes a cup portion CPP and a flange portion FLP extending radially outwardly therefrom. Cup portion CPP includes a side wall SWL and a bottom wall BWL having a central opening COP. Flange portion FLP includes a flange wall FWL that is interconnected with side wall SWL by a curvilinear wall portion CWP. Flange wall FWL terminates opposite curvilinear wall portion CWP at a peripheral end wall EWL. The side and bottom walls of the cup portion form a central cavity or bore BRE having a central axis AX1.

To illustrate the improvements resulting from the use of a die assembly having a floating die section, the following discussion of end members EMB is provided. Using a traditional die assembly, end members were produced having a total indicator runout (TIR) of end wall EWL with respect to side wall SWL of from about 0.010 inches to about 0.018 inches. By using a die assembly having a floating die section in accordance with the present invention, the TIR of end wall EWL with respect to side wall SWL has been reduced to 0.006 inches or less.

Turning now to FIGS. 5–11, another embodiment of a die assembly 200 is shown supported between upper and lower platens UPL and LPL of a press (not shown). Die assembly 200 includes a plurality of die sections adapted to at least partially form an end member EMB from a strip of material STM. The die sections are supported between an upper die shoe 202 and a lower die shoe 204, which are respectively secured to upper platen UPL and lower platen LPL in a suitable manner. Typically, one of the platens of the press is stationary while the other is vertically displaceable. For example, lower platen LPL can be stationary, and upper platen UPL can be adapted to move between an upper position and a lower position, such as the closed die position shown in FIG. 5, for example.

Die assembly 200 includes die sections 206, 208 and 210. Each of the die sections includes an upper die portion 206U, 208U and 210U and a lower die portion 206L, 208L and 210L. Upper die portions 206U and 208U are fixedly supported on upper die shoe 202 in a suitable manner, such as by using fasteners 212, for example. Lower die portions 206L and 208L are supported on a base 214 that is suitably secured to lower die shoe 204, such as by using fasteners (not shown), for example. Upper die portion 210U and lower die portion 210L are movably supported between the upper and lower die shoes. Upper die portion 210U includes a punch 216 that is fixedly secured on an upper floating die shoe 218 in a suitable manner, such as by using fasteners 220, for example. Punch 216 has a central axis AX2 and a plurality of tooling surfaces, which include a pilot 222 and an end wall 224.

Figure 6:
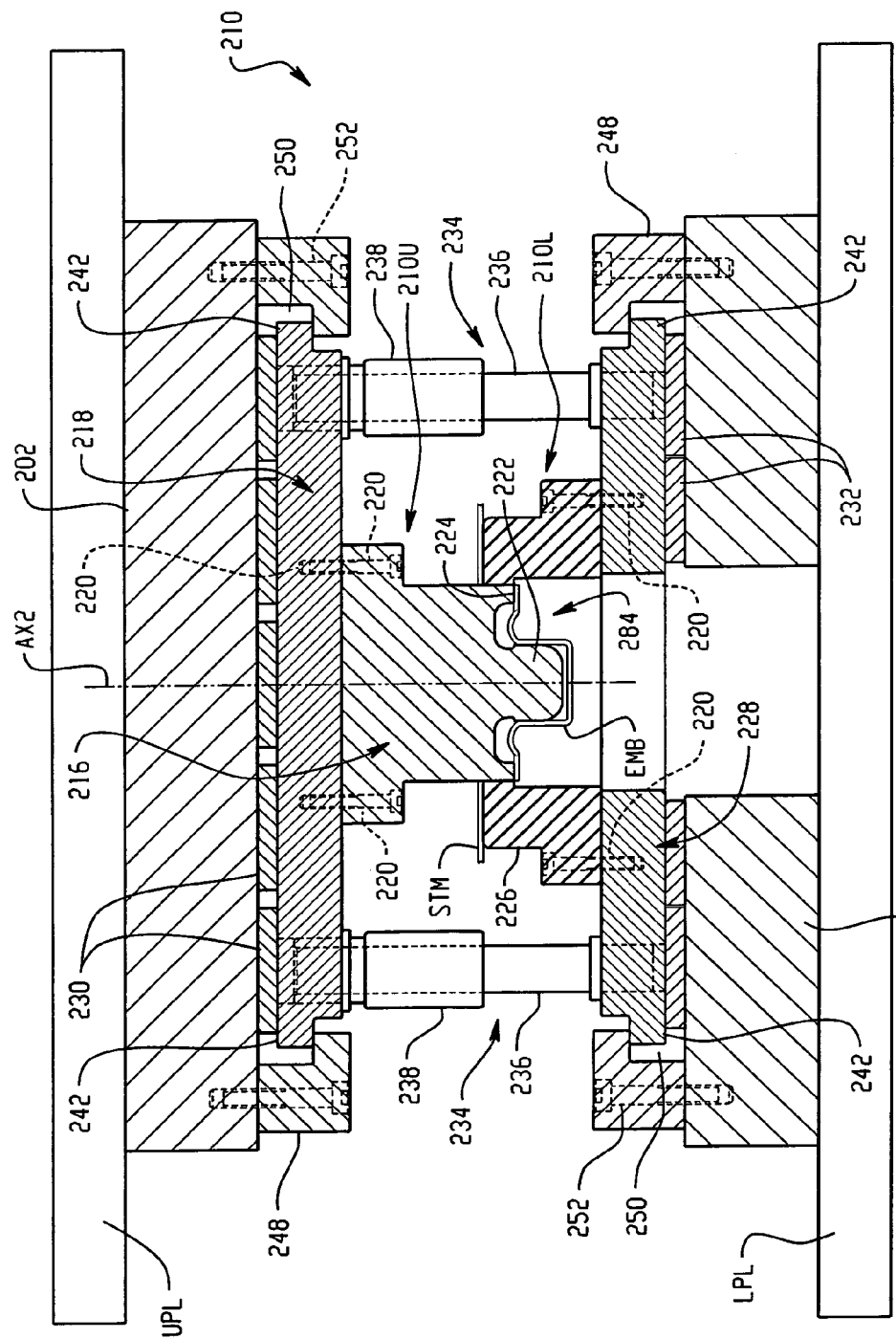
FIG. 6 is a side view, in partial cross section, of a floating die section from the die assembly in FIG. 5 taken along line 6—6.

Lower die portion 210L includes a die ring 226 that is fixedly secured to a lower floating shoe 228 in a suitable manner, such as by using fasteners 220, for example. An upper wear plate 230 is disposed between upper floating shoe 218 and upper die shoe 202. Similarly, a lower wear plate 232 is disposed between lower floating shoe 228 and lower die shoe 204. As such, die section 210 is movably supported on the press (not shown) between platens UPL and LPL thereof. Wear plates 230 and 232 can be formed from any suitable material, such as steel or bronze, for example. Additionally, the wear plates can optionally be formed from a plurality of smaller wear plates supported adjacent one another, such as can be seen in FIG. 6, for example.

The upper and lower floating shoes are interconnected by alignment members 234, which maintain punch 216 and die ring 226 in alignment with one another while permitting the die section to be movably supported on the press. Alignment members 234 include an alignment rod 236 secured on and projecting from lower floating shoe 228. Guide bushings 238 are secured on upper floating shoe 218 and receive the alignment rods. Upper and lower floating shoes 218 and 228 each include side walls 240 and opposing end flanges 242. End stops 244 are secured to the upper and lower die shoes in spaced relation to side walls 240 of the upper and lower floating shoes, such that a gaps 246 are formed therebetween. Additionally, keeper blocks 248 are secured on upper floating shoe 218 and lower floating shoe 228 adjacent end flanges 242 such that gaps 250 are formed therebetween. The end stops and keeper blocks can be secured on the upper and lower die shoes in any suitable manner, such as by using pins 251 (FIGS. 10 and 11) and/or fasteners 252, for example.

The keeper blocks retain the upper and lower floating shoes adjacent the respective upper and lower wear plates, while permitting movement of the die section relative to the die shoes as well as the other die sections. It will be appreciated that die section 210 can translate in any direction within the limits of the end stops and keeper blocks. That is, die section 210 is not limited to unidirectional lateral movement or unidirectional longitudinal movement. Rather, the die section is free to float in any direction.

Figure 7:
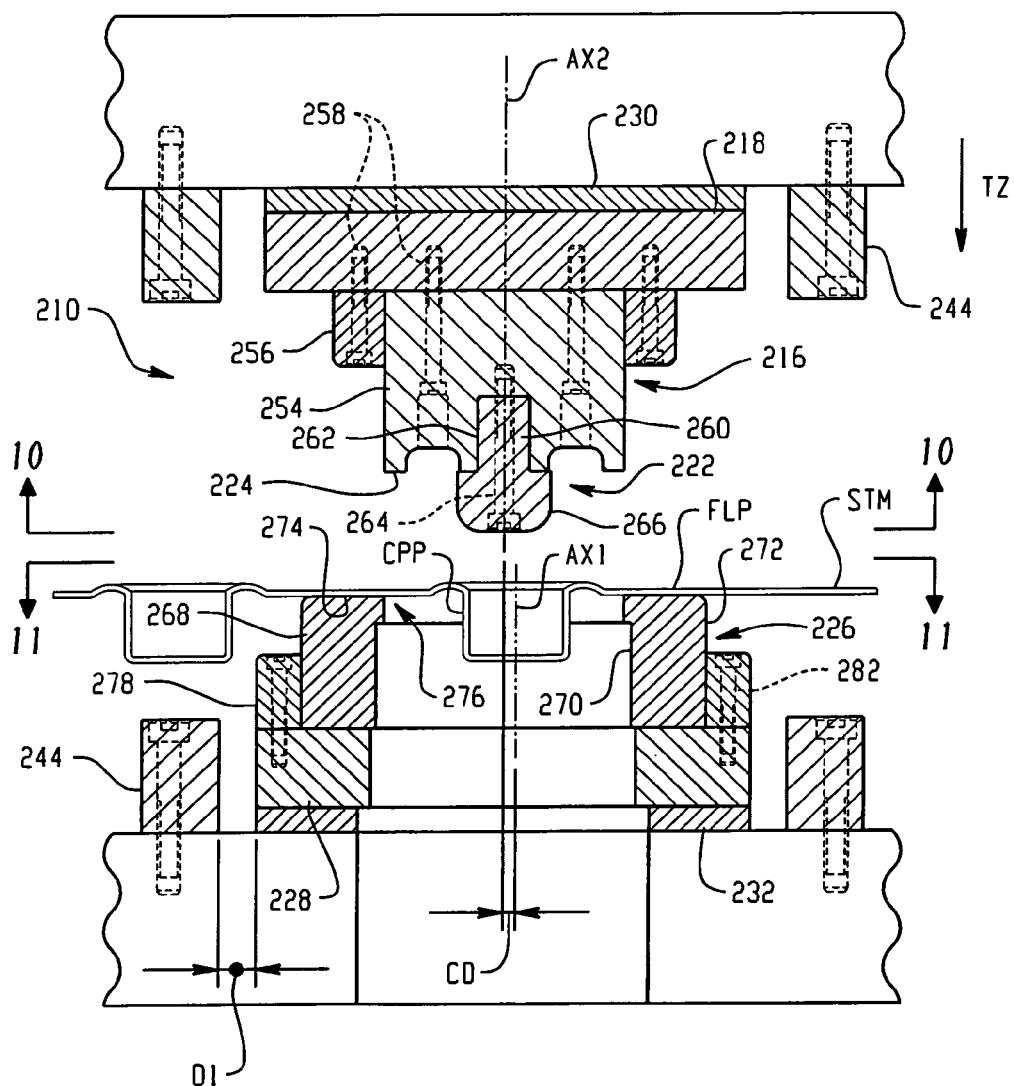
FIG. 7 is an enlarged front view of the floating die section in FIG. 5 shown with upper and lower die portions thereof in an open position prior to engaging the strip of material.
Figure 8:
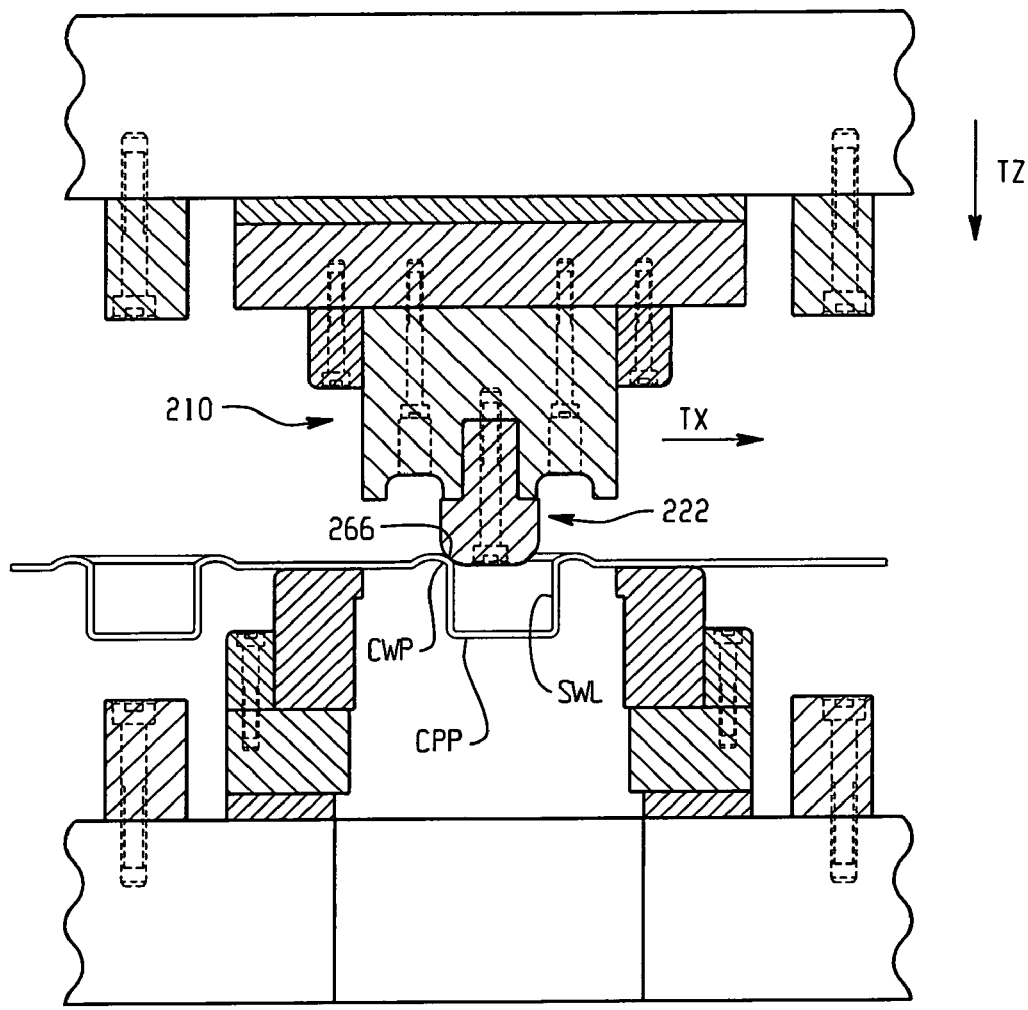
FIG. 8 is the front view of the floating die section in FIG. 7 shown with the upper die portion initially engaging a first feature on the strip of material.
Figure 9:
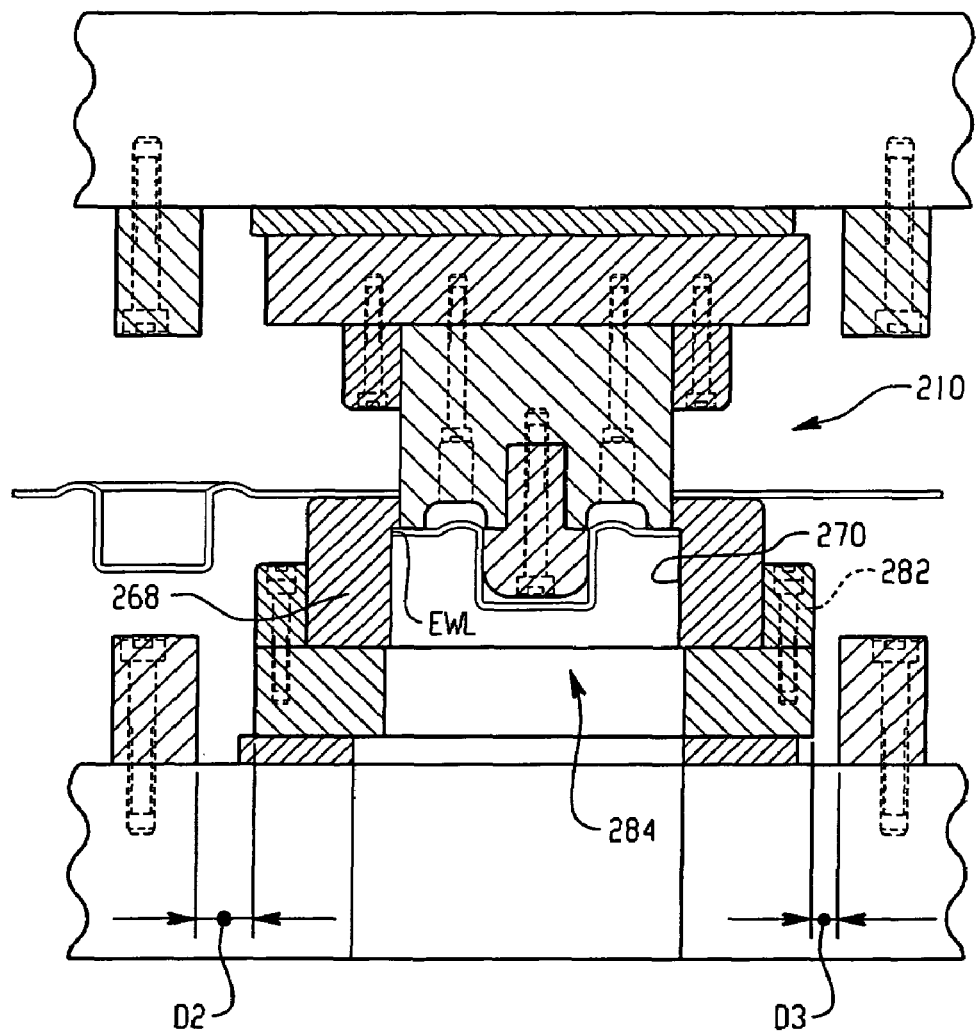
FIG. 9 is the front view of the floating die section in FIG. 7 shown with the upper die portion fully engaging the first feature on the strip of material.
Figure 10:
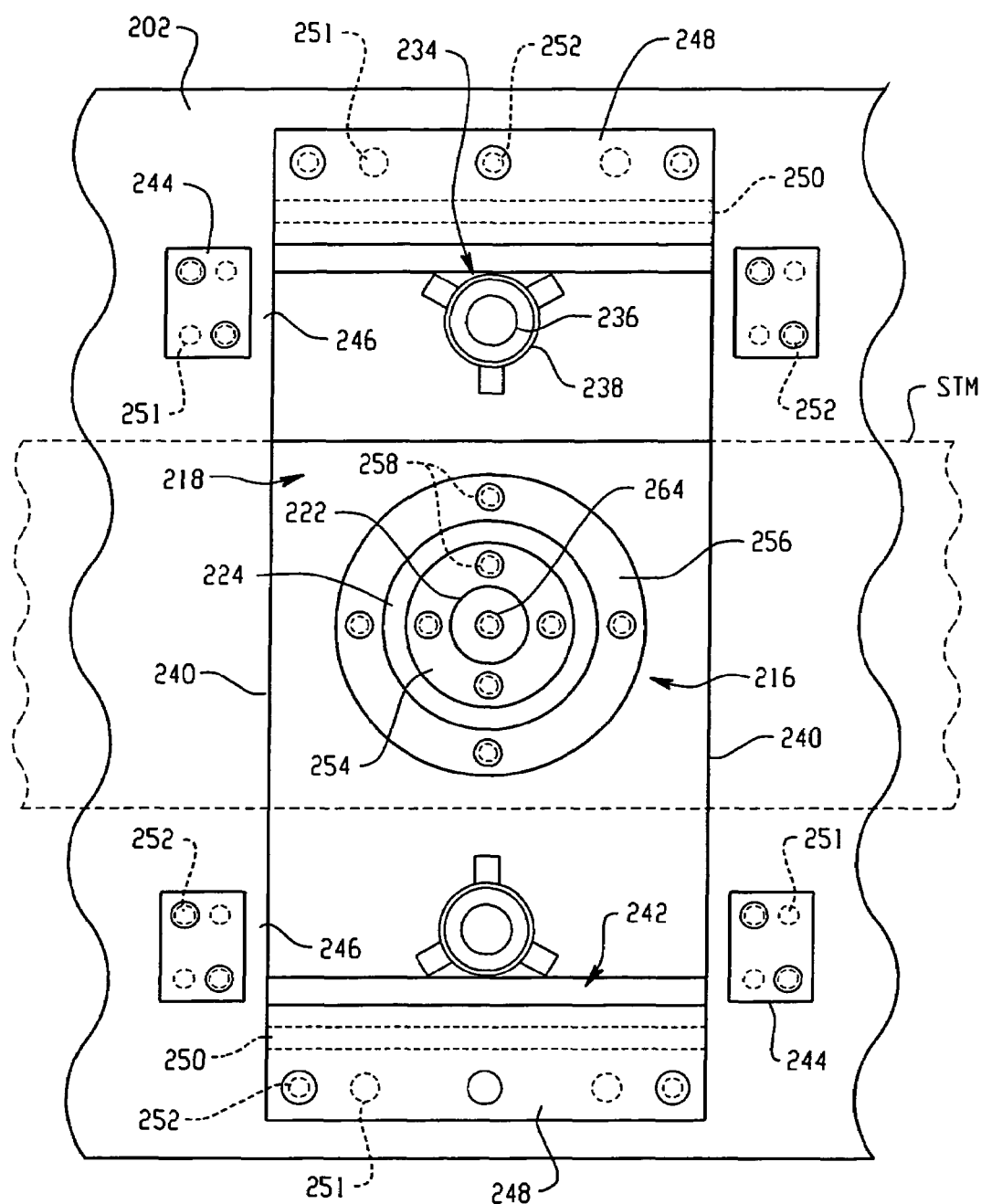
FIG. 10 is a bottom view of the upper die portion of the floating die section in FIG. 7 taken from line 10—10.
Figure 11:
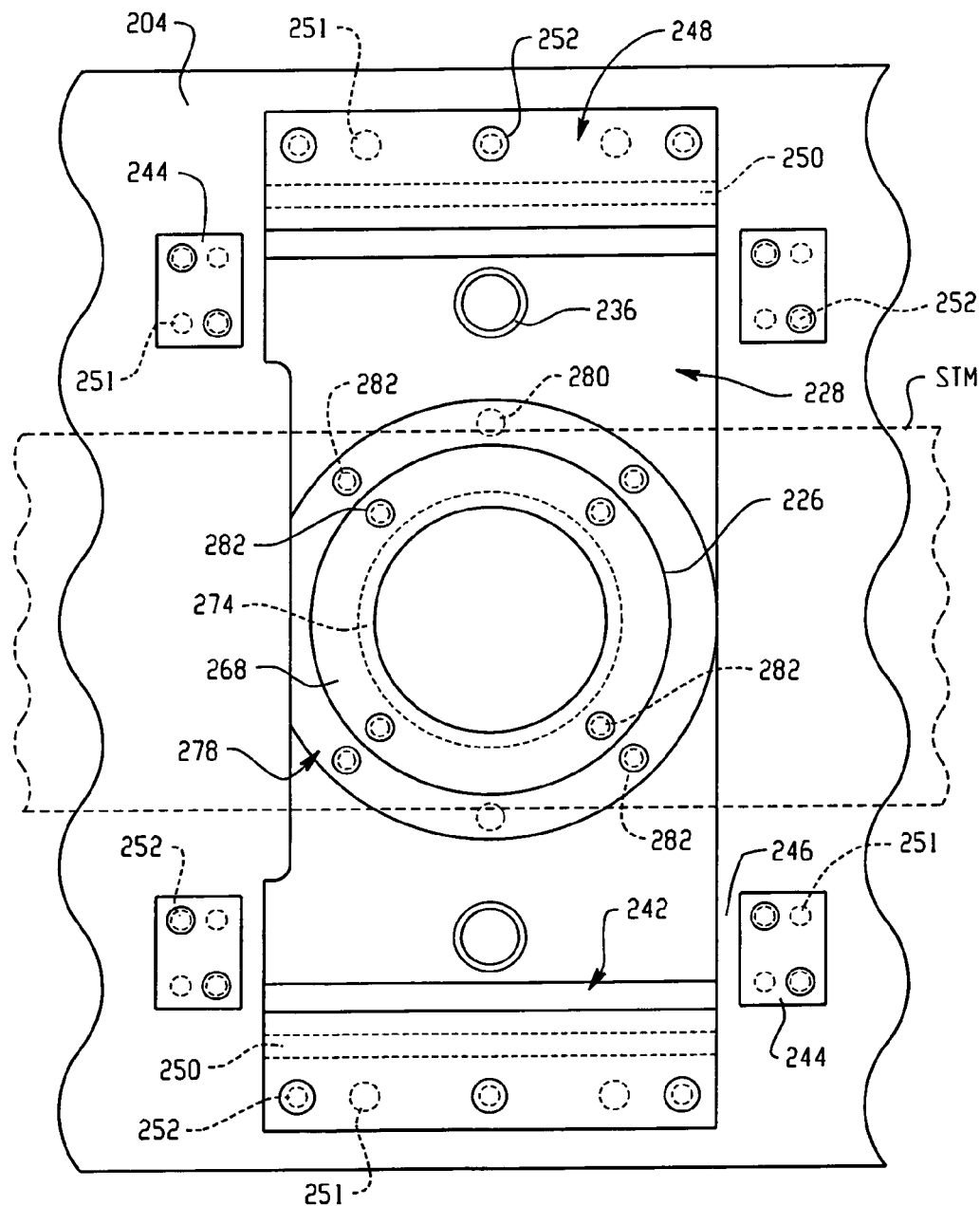
FIG. 11 is a top view of the lower die portion of the floating die section in FIG. 7 taken from line 11—11.

Punch 216 and die ring 226 are shown in additional detail in FIGS. 7–11. Punch 216 includes a punch body 254 having a tooling surface (not numbered) along end wall 224. A punch locator ring 256 extends about the periphery of punch body 254. Both the punch body and the punch locator ring are secured on upper floating shoe 218 in a suitable manner, such as by using pins (not shown) and in fasteners 258, for example. Pilot 222 can optionally be formed as a separate component from punch body 254, as shown in FIGS. 7–9. Pilot 222 has a stem portion 260 that is received within a corresponding bore 262 in punch body 254, and secured thereon in a suitable manner, such as by using a fastener 264, for example. Pilot 222 includes an outer tooling surface 266 that has a curvilinear portion (not numbered), suitable for engaging an associated first feature of the strip of material.

Die ring 226 includes a die ring body 268 that has an inside wall 270, an outside wall 272 and an upper end wall 274. A tooling surface 276 is formed at least partially along inside wall 270 and end wall 274, and is adapted to cooperate with the tooling surface on punch body 254 to form a second feature, such as edge wall EWL of end member EMB, for example. A die ring locator 278 extends about the periphery of die ring body 268. Both the die ring body and die ring locator are secured on lower floating shoe 228 in a suitable manner, such as by using pins 280 (FIG. 11) and/or fasteners 282 (FIGS. 7–9 and 11).

Additionally, it will be appreciated that other well known and commonly used components and/or arrangements may be included in the above-described die assemblies. For example, a bridge stripper (not shown) having a stripper window (not shown) disposed adjacent the punch and/or die ring can be included to minimize the movement of the strip of material. Furthermore, it will be appreciated that gaps, such as gaps 116, 118, 246 and 250, for example, as well as other dimensions shown in the drawings, are shown oversized for the purposes of clarity of illustration. While it is to be understood that any suitable dimensions can be used, one example of a suitable range for gaps 116, 118, 246 and 250 is from about 0.100 inches to about 0.300 inches, and preferably about 0.200 inches.

FIGS. 7–9 illustrate die section 210 moving from a first or top position in FIG. 7 vertically downwardly, as indicated by arrows TZ (FIGS. 7 and 8), toward a second or bottom position in FIG. 9. In FIG. 7, die section 210 is out of alignment with cup a first feature on strip of material STM, which, in this case, is cup portion CPP. The misalignment is indicated by dimension CD which extends from axes AX1 and AX2. As shown in FIG. 8, the upper die portion of die section 210 continues to be downwardly displaced toward the lower die portion, as indicated by arrow TZ. Tooling surface 266 of pilot 222 engages a feature formed on the strip of material, such as curvilinear wall portion CWP or, alternately, side wall SWL of cup portion CPP. It will be appreciated that the strip of material, at this instant, is stationary and substantially rigidly supported. As such, the downward movement of the upper die portion acting through the tooling surface of the pilot as the same engages the first feature of the stationary strip of material, in this case, curvilinear wall portion CWP. This causes a transverse reactionary force that begins displacing die section 210, as indicated by arrow TX.

As pilot 222 continues to engage wall portion CWP, die section 210 continues to move transversely until the pilot fully engages bore BRE and the punch and die ring are substantially centered in relation to the bore. As shown in FIG. 7, the gaps between the die section and end blocks are substantially equally spaced, as indicated by dimensions D1, prior to the pilot engaging the bore. In FIG. 9, however, dimensions D2 and D3 are shown as being different from dimension D1 as well as from one another. This illustrates that die section 210 has shifted relative to the strip of material and, therefore, relative to the other die sections. Again, the size of the dimensions are exaggerated for the purposes of clarity of illustration. Also, die section 210 is shown moving in a longitudinal manner, as indicated by arrow TX. It will be distinctly understood, however, that this is merely for illustrative purposes and, in FIGS. 7–9, the die section is free to move in any direction within the bounds of the keeper blocks and end stops.

As the upper die portion continues to move downwardly, thereafter, the punch and die ring form the second feature, as shown in FIG. 9, which, in this case, is end wall EWL. The now substantially complete end member EMB is delivered from the die section through a discharge passage 284 formed at least partially by inside wall 270 of die ring body 268.

Once the upper die portion reaches the bottom of the downward stroke, it is returned to a top position via an upward return stroke in preparation for another downward stroke. Once the upper die portions of each of the die sections has cleared the strip of material, then the strip of material can be advanced such that the next first feature on the strip of material is positioned between the upper and lower die portions of die section 210. Thereafter, the process is repeated.

While the invention has been described with reference to the preferred embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims and the equivalents thereof.

The invention claimed is:

1. A die assembly for use on a press and adapted to form a plurality of features on a strip of material, said die assembly comprising:
   a first die section supported on the press and having a first tooling surface for forming a first feature; and,
   a second die section longitudinally spaced from said first die section, said second die section supported on the press and capable of at least lateral movement relative to said first die section and to the longitudinal spacing, and said second section having second and third tooling surfaces, said second tooling surface for engaging the first feature and at least laterally displacing the second die section transverse to the longitudinal spacing, and said third tooling surface for forming a second feature.

2. A die assembly according to claim 1, wherein said first and second die sections each respectively include upper and lower die portions.

3. A die assembly according to claim 2 further comprising an upper die shoe and a lower die shoe in spaced relation to one another and supported on the press, said first and second die sections being disposed between said upper and lower die shoes.

4. A die assembly according to claim 3, wherein said first upper die portion is fixedly secured on said upper die shoe, said first lower die portion is fixedly secured on said lower die shoe in alignment with said first upper die section, and said second die section is moveably supported between said upper and lower die shoes.

5. A die assembly according to claim 4 further comprising a wear plate disposed between said second die section and one of said upper and lower die shoes facilitating sliding movement therebetween.

6. A die assembly according to claim 4, wherein said second die section includes an alignment member interconnecting said second upper die portion and said second lower die portion.

7. A die assembly according to claim 4 further comprising a plurality of retaining members disposed on one of said upper and lower die shoes to thereby limit the movement of said second die section.

8. A die assembly according to claim 1, wherein said at least lateral movement includes a transverse displacement component and a longitudinal displacement component.

9. A die assembly adapted to form first and second substantially concentric features on a strip of material, said die assembly comprising:
   a first die section having first upper and lower die portions with corresponding first upper and lower tooling surfaces for forming the first feature; and,
   a second die section longitudinally spaced from said first die section, said second die section adapted for radial movement relative to the first feature and to the longitudinal spacing, said second die section having second upper and lower die portions with corresponding second upper and lower tooling surfaces for forming the second feature, and one of said second upper and lower die sections including a third tooling surface for engaging the first feature to thereby radially locate said second die section transverse to the longitudinal spacing.

10. A die assembly according to claim 9, wherein said second die section includes a pilot extending from one of said second upper and lower die portions and said third tooling surface is disposed along said pilot.

11. A die assembly according to claim 9, wherein the first feature includes a side wall and said third tooling surface engages the side wall to locate said second die section relative thereto.

12. A die assembly according to claim 11, wherein the side wall is substantially cylindrical and said third tooling surface includes a substantially cylindrical portion dimensioned to be received within the side wall.

13. A die assembly according to claim 9, wherein the second feature is a substantially circular peripheral wall, said second upper die portion includes a punch having a substantially circular second upper tooling surface, and said second lower die portion includes a die ring having a substantially circular second lower tooling surface.

14. A die assembly according to claim 9, wherein said first feature has an approximate circular cross-section shape and said second tooling surface is adapted to engage said first feature and radially displace said second die section relative to said first feature, said radial displacement including a transverse displacement component and a longitudinal displacement component.

15. A method of forming first and second features on a strip of material, said method comprising steps of:
   a) providing a first die section having a first tooling surface and a second die section longitudinally spaced from said first die section and having second and third tooling surfaces, said second die section being at least laterally displaceable relative to said first die section and to the longitudinal spacing;
   b) providing the strip of material and advancing a portion of the strip of material into a first position adjacent said first tooling surface of said first die section;
   c) forming a first feature on the strip of material using said first tooling surface;
   d) advancing the strip of material into a second position such that the first feature is adjacent said second tooling surface;
   e) engaging said second tooling surface with the first feature to displace said second die section and thereby locate said third tooling surface relative to said first feature and transverse to the longitudinal spacing; and
   f) forming a second feature on the strip of material using said third tooling surface.

16. A method according to claim 15, wherein said first die section has first upper and lower die portions and said second die section has second upper and lower die portions, said first and second upper die portions and said first and second lower die portions being displaceable toward one another in a closing stroke and being displaceable away from one another in an opening stroke, and steps e) and f) being performed on the same closing stroke.

17. A method according to claim 15, wherein the strip of material is substantially stationary in step e).

18. A method according to claim 15, wherein step c) includes forming the first feature by one of drawing, coining, blanking, and breaking said strip of material.

19. A method according to claim 15, wherein step f) includes forming the second feature by one of drawing, coining, blanking, and breaking said strip of material.

20. A method according to claim 15, wherein the first feature formed in step c) is a cup having a side wall, said second die section includes a pilot adapted to be received within the cup and engage side wall, and step e) includes at least partially extending said pilot at least partially into said cup to engage the side wall and position said second die section in relation thereto.

21. A method according to claim 15, wherein step f) includes blanking a workpiece from the strip of material that includes the first and second features.

22. A method according to claim 21, wherein said step of blanking a workpiece includes substantially simultaneously forming the second feature.

* * * * *